United States Patent [19]
Hamura et al.

[11] Patent Number: 5,486,679
[45] Date of Patent: Jan. 23, 1996

[54] ARC WELDING CONTROL METHOD FOR A WELDING ROBOT

[75] Inventors: Masayuki Hamura; Mitsuhiro Okuda; Yuuki Makihata, all of Oshino, Japan

[73] Assignee: Fanuc Ltd., Minamitsuru, Japan

[21] Appl. No.: 284,474

[22] PCT Filed: Nov. 22, 1993

[86] PCT No.: PCT/JP93/01708

§ 371 Date: Aug. 4, 1994

§ 102(e) Date: Aug. 4, 1994

[87] PCT Pub. No.: WO94/13423

PCT Pub. Date: Jun. 23, 1994

[30] Foreign Application Priority Data

Dec. 11, 1992 [JP] Japan ..................... 4-352422

[51] Int. Cl.$^6$ ..................... B23K 9/06
[52] U.S. Cl. ..................... 219/130.5; 219/125.1; 219/130.4
[58] Field of Search ............ 219/130.5, 130.4, 219/125.1, 125.11, 124.34

[56] References Cited

U.S. PATENT DOCUMENTS

| | | | |
|---|---|---|---|
| 3,555,239 | 1/1971 | Kerth | 219/124.34 |
| 3,689,734 | 9/1972 | Burley et al. | 219/130.5 |
| 4,390,954 | 6/1983 | Manning | 364/477 |
| 4,618,760 | 10/1986 | Murch et al. | 219/130.4 |
| 5,059,765 | 10/1991 | Laing | 219/125.11 |

FOREIGN PATENT DOCUMENTS 57-171575  10/1982  Japan .

*Primary Examiner*—Clifford C. Shaw
*Attorney, Agent, or Firm*—Staas & Halsey

[57] ABSTRACT

An arc welding control method for a welding robot wherein a welding current and a welding voltage are controlled at the start of arc welding so as to prevent the formation of a molten metal pool. When arc start is instructed, a welding command voltage E and a welding command current I are set to initial values E0 and I0, respectively (S4). The welding command voltage E is gradually increased until an arc is generated (S6). When an arc is generated, the welding command voltage E and the welding command current I are set to the stopped-state voltage Es and the stopped-state current Is of the robot, respectively (S9). Thereafter, as robot acceleration processing progresses, the welding command voltage E and current I are gradually increased with increase in the robot moving speed (S11). When a robot acceleration time has passed, the welding command voltage E and the welding command current I are set to the normal welding voltage Ec and the normal welding current Ic, respectively.

5 Claims, 2 Drawing Sheets

ARC WELDING CONTROL METHOD FOR A WELDING ROBOT

FIELD OF THE INVENTION

The present invention relates to an arc welding control method for a welding robot, more particularly, to a method of controlling a welding current and a welding voltage at the start of a welding operation.

DESCRIPTION OF THE RELATED ART

The present invention is directed to a welding robot which has a welding torch at a distal end of an arm thereof and in which welding is carried out by moving the welding torch along a taught path. When a welding operation is started, first, a preset welding voltage and current are commanded from a robot control device to a controller of a welding machine. On receiving the command, the welding machine supplies electric power between a workpiece and an electrode of the welding torch. When an arc discharge is generated between the workpiece and the electrode, it is detected by the controller of the welding machine, which then supplies an arc generation signal to the robot control device. On receiving the arc generation signal, the robot control device commands welding voltage and current for normal welding to the controller of the welding machine, and at the same time actuates the robot arm to move the welding torch along the taught path. Usually, the above-described control operation is executed at the start of arc welding using a welding robot.

As described above, when arc welding is started according to the conventional method, a preset welding voltage having a fixed value is applied until an arc is generated. The predetermined voltage to be applied at the start of welding is usually set to a value greater than a minimum voltage necessary for generating an arc so that an arc can be generated without fail. Thus, at the start of welding, an excessive current flows, causing a molten pool to be formed on the workpiece, which deteriorates the quality of the bead. Also, such molten pool causes poor appearance of the finished weld.

When an arc is generated, the welding command voltage and current are respectively switched to the welding voltage and current for normal welding, and at the same time the robot arm starts to be driven to move the welding torch. In general, however, robot motion cannot immediately attain the command speed, and usually the command speed is reached upon lapse of a certain period of time after an acceleration process is executed. Thus, in an initial interval wherein movement of the robot is started following the generation of an arc between the workpiece and the electrode, welding command voltage and current corresponding to the command speed of the robot are set in the controller of the welding machine, even when the command speed is not reached by the robot, and actual voltage and current are controlled to the command voltage and current, respectively, by the controller of the welding machine. This causes a problem that molten metal forms a pool during the robot acceleration period, deteriorating the quality of the bead.

SUMMARY OF THE INVENTION

An object of the present invention is to provide an arc welding control method for a welding robot, by which formation of a bead pool is prevented when arc welding is started.

One embodiment of an arc welding control method according to the present invention comprises the steps of setting a welding command voltage to a predetermined initial voltage value in response to an arc start command, to supply electric power between a workpiece and an electrode, and gradually increasing the welding command voltage from the initial voltage value until an arc is generated between the workpiece and the electrode.

The arc welding control method according to the present invention further comprises setting the welding command voltage to a predetermined stopped-state voltage value and starting movement of the welding robot when an arc is generated between the workpiece and the electrode, gradually increasing the welding command voltage corresponding to the increase in moving speed of the welding robot during an acceleration time until the moving speed of the welding robot reaches a predetermined moving speed, and setting the welding command voltage to a normal welding voltage value when the moving speed of the welding robot has reached the predetermined moving speed.

After an arc start is instructed, the welding command voltage is gradually increased from the initial value and thus, the actual welding voltage gradually rises to generate an arc. During this period of time, the welding command current is maintained at the set arc standby current. When an arc is generated, the welding command voltage and the welding command current are respectively set to the stopped-state voltage and stopped-state current for the robot, which are smaller than the normal welding voltage and current, respectively, and the welding command voltage and current are then gradually increased from the respective command voltage and current corresponding to the acceleration of the robot moving speed. The welding command voltage and current ape controlled so as to become equal to the normal welding voltage and current, respectively, when the robot moving speed reaches a target command speed upon completion of the acceleration.

According to the methods described above, no excessive welding voltage is applied during the period from the output of an arc start command to the generation of an arc. After an arc is generated, welding voltage and current are instructed depending on the robot moving speed.

DESCRIPTION OF THE PREFERRED EMBODIMENTS

Figure 1:
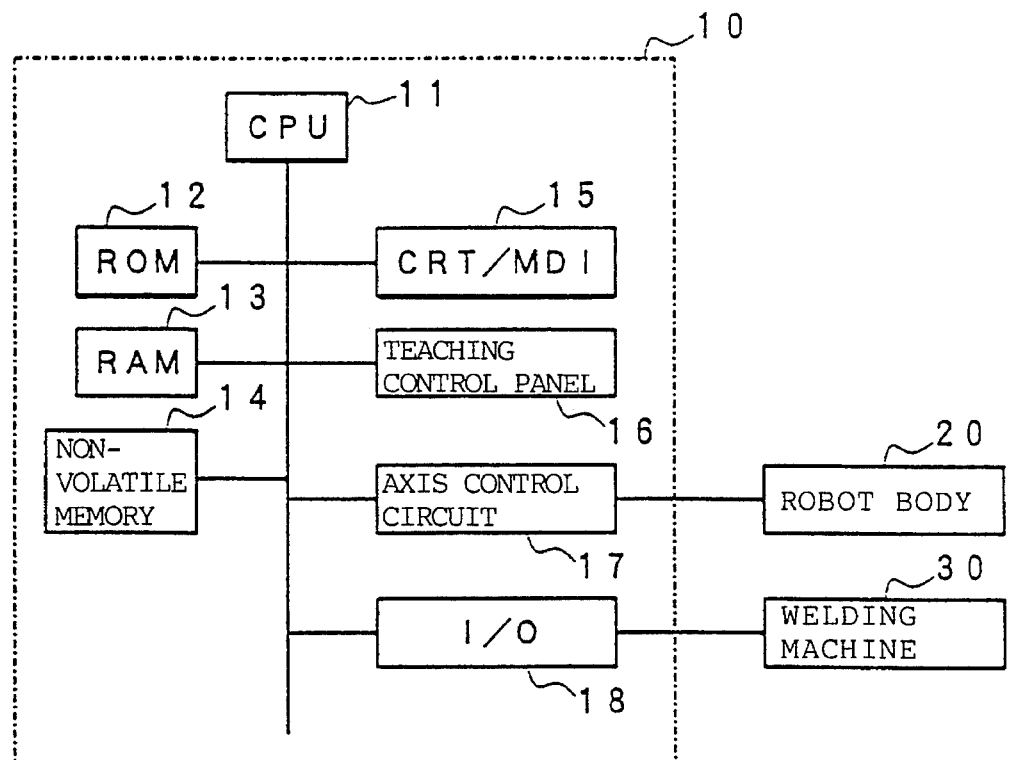
FIG. 1 is a block diagram of a principal part of a welding robot for carrying out a method according to the present invention.

As shown in FIG. 1, a control device 10 for a robot comprises a CPU 11, a ROM 12 for storing control programs, a RAM 13 for temporarily storing data, etc., a nonvolatile read/write memory 14 for storing a teaching program and the like, a manual input device 15 with a display device, a teaching control panel 16, an axis control circuit 17 for controlling the drive sources (servomotors) respectively associated with axes of the robot, and an input/output interface 18. The elements 11 to 18 are interconnected by a bus. The axis control circuit 17 is connected to servomotors for driving the respective axes of a robot body 20, and the input/output interface 18 is connected to a controller of an arc welding machine 30. The welding machine 30 has a torch (not shown) including an electrode for machining. The torch is mounted on a robot hand at a distal end of an arm of the robot body 20 and is moved along a welding path taught by the teaching program.

The construction of the above-described welding robot is similar to that of a conventional arc welding robot. According to the present invention, the welding voltage and the welding current are controlled optimally even when arc welding is started using a welding robot known in the art.

Figure 2:
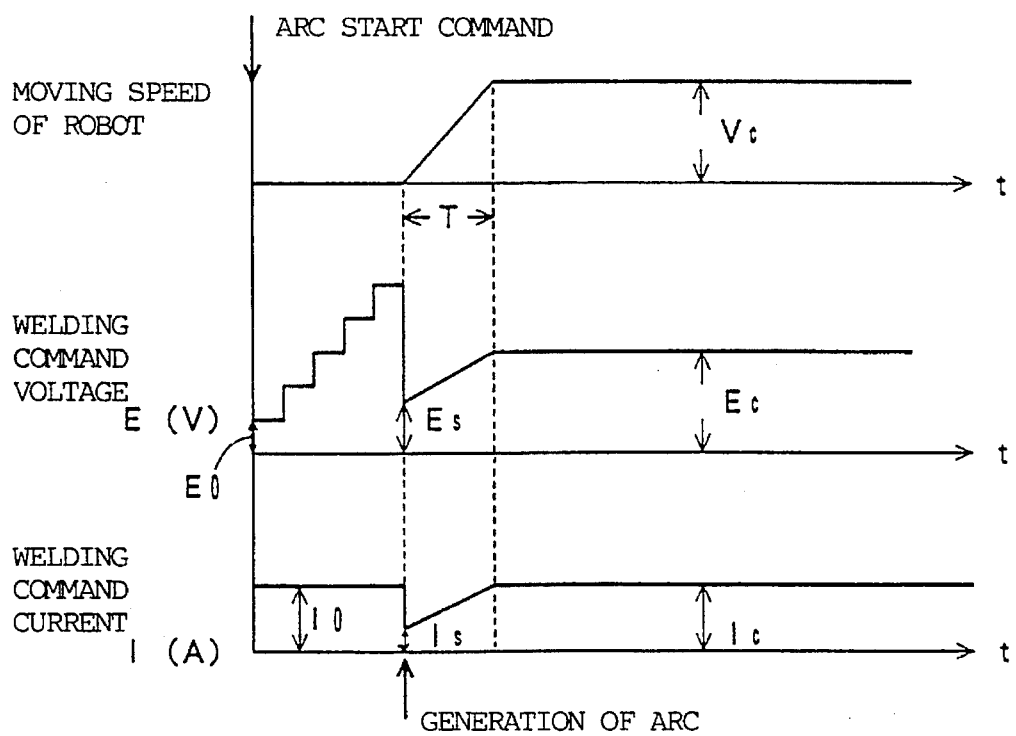
FIG. 2 is a timing chart illustrating how robot moving speed, welding command voltage, and welding command current are related to one another according to an embodiment of the present invention.

FIG. 2 shows the relationship among a robot moving speed V, a welding command voltage E, and a welding command current I at the start of welding.

Upon reading an arc start command from the teaching program, the processor 11 of the robot control device 10 supplies the controller of the welding machine 30 with a preset arc standby current I0, as the welding command current I, and an initial value E0, as the welding voltage E. Thereafter, the welding command voltage E is gradually increased in a stepwise manner, while the welding command current I remains unchanged, until an arc is generated without varying the welding command current I. When an arc is generated due to an increased actual welding voltage across a workpiece and the electrode, the controller of the welding machine 30 detects the arc and outputs an arc generation signal. When the arc generation signal is supplied to the robot control device 10 via the input/output interface 18, the processor 11 switches the welding command voltage E to a set robot stopped-state voltage Es and also switches the welding command current I to a set robot stopped-state current Is.

Further, the processor 11 of the robot control device 10 drives the axis control circuit to actuate the robot arm along a travel path taught by the teaching program, whereby the welding torch is moved. In this case, since the robot arm cannot be moved immediately and in order to prevent vibration and the like due to sudden movement of the arm, an acceleration/deceleration processing is usually carried out. That is, the moving speed of the robot is controlled to become equal to a target speed Vc upon lapse of a predetermined acceleration time T.

According to the present invention, during this acceleration time T, the welding command voltage E and the welding command current I are increased from the stopped-state voltage Es and stopped-state current Is to preset normal welding voltage Ec and current Ic, respectively, with increase (acceleration) in the moving speed of the robot. When the acceleration processing ends, and the robot moving speed is equal to the command speed Vc, and the welding voltage command E and the welding current command I reach the normal welding voltage Ec and the normal welding current Ic, respectively. Thereafter, the command voltage and the command current remain unchanged.

When supplied with the welding voltage command E and the welding current command I from the robot control device 10, the controller of the welding machine 30 controls actual welding voltage and current so that they become equal to the command voltage and the command current, respectively.

According to the present invention, the welding voltage and current are controlled in the above-described manner, so that no excessive voltage is applied at the start of arc producing but rather an optimum voltage for generating an arc. Furthermore, since the welding voltage and current are set in accordance with the moving speed of the robot (the moving speed of the welding torch), it is possible to prevent a molten metal pool from being formed on the workpiece.

Those processings to be executed by the processor 11 of the robot control device 10 at the start of welding operation will be explained with reference to the flowchart of FIG. 3.

Figure 3:
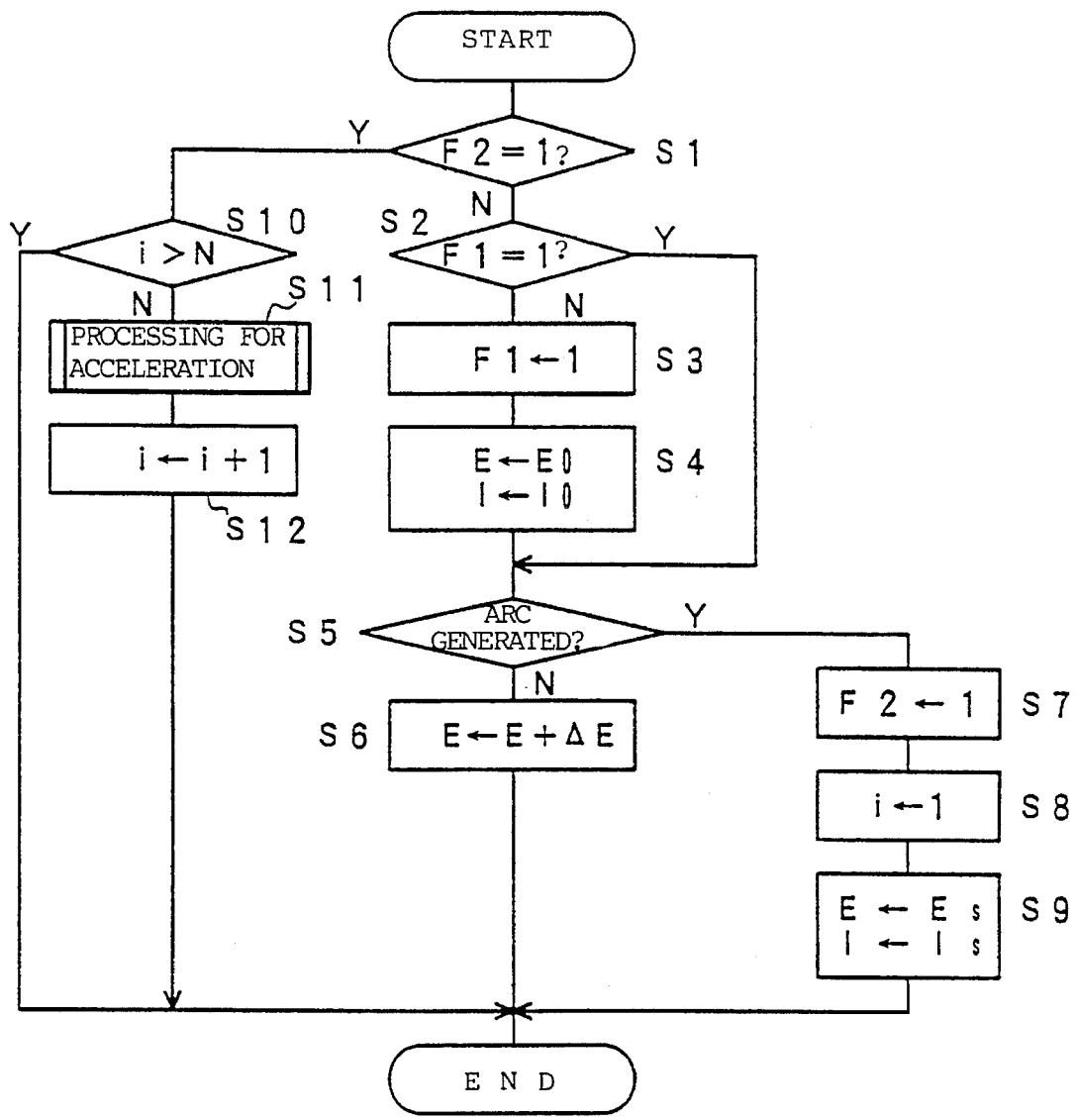
FIG. 3 is a flowchart of a processing for controlling the welding voltage and current according to the present invention.

Upon reading the arc start command from the teaching program, the processor 11 executes the processings of FIG. 3 in every predetermined period τ. Prior to execution of these processings, the values of flags F1 and F2 and an index i are initialized to "0".

First, in Step S1, it is determined whether the flag F2, which indicates generation of an arc, is set to "1". Since, in the first cycle of the processings, the flag F2 is set to "0", the flow proceeds from Step S1 to Step S2, wherein it is determined whether the flag F1 is set to "1". The flag F1 is also set to "0" by initialization, and thus the flow proceeds from Step S2 to Step S3, wherein the flag F1 is set to "1".

In Step S4, the welding command voltage E is set to the preset initial voltage E0, and the welding command current I is set to the preset arc standby current I0. The initial voltage E0 is set to a value at which no arc is generated, and may be set to 0 (V). The welding command voltage E and the welding command current I are outputted to the welding machine 30 as a voltage command and a current command, respectively.

In Step S5, it is determined whether an arc generation signal has been inputted from the controller of the welding machine 30. In the first cycle of the processing, arc is not produced and thus no arc generation signal is provided, and so the flow proceeds to Step S6, wherein the welding command voltage E supplied to the welding machine is increased by a preset small voltage ΔE, followed by termination of the present cycle.

In the subsequent cycle, the flag F1 has been set to "1", and so the flow proceeds from Steps S1 and S2 to Step S5, wherein it is determined whether an arc generation signal has been supplied from the controller of the welding machine 30. If arc has not been produced, the flow proceeds to Step S6, and the welding command voltage is increased by ΔE, followed by termination of this cycle. In the following cycles, Steps S1, S2, S5 and S6 are repeatedly executed in the order mentioned, whereby the welding command voltage E is gradually increased. As the welding command voltage E gradually increases, the voltage applied across the workpiece and the electrode of the welding machine 30 is increased, and when an arc is generated, the controller of the welding machine 30 detects the arc and outputs an arc generation signal to the robot control device 10. When the robot control device 10 receives the arc generation signal, the processor 11 detects the signal in Step S5, and then proceeds to Step S7. In Step S7, the flag F2 is set to "1", thereby retaining data that arc has been generated, and in Step S8, the index i is set to "1". Subsequently, in Step S9, the welding command voltage E is switched to the robot stopped-state voltage Es and the welding command current I is switched to the robot stopped-state current Is, followed by termination of this cycle.

Also in response to the arc generation signal, the processor 11 of the robot control device 10 drives the axis control circuit 17 in accordance with move commands given by the teaching program, whereby the robot is moved. In this case, an acceleration/deceleration control processing is carried out and the moving speed of the robot is controlled to become equal to the command speed Vc in the set acceleration/deceleration time T.

After an arc is generated, and the flag F2 is set to "1", the flow proceeds from Step S1 to Step S10, wherein it is determined whether the index i has become greater than a number N of processing cycles τ, which corresponds to the time T required for the aforementioned acceleration processing. The value N is set to T/τ (i.e., N=T/τ) in the case where linear acceleration/deceleration control is used for the robot acceleration/deceleration control, and the acceleration/deceleration time is T, as shown in FIG. 2.

If the index i is not greater than N, the flow of processing proceeds to Step S11, wherein the welding voltage command E and the welding current command I are increased by a processing similar to that for the acceleration control of the robot so that the welding voltage command E and the welding current command I are increased from the welding voltage command Es and the welding current command Is to the normal welding voltage Ec and current Ic, respectively, with increase in the robot moving speed of the robot during the acceleration time T.

In general, to carry out the linear acceleration/deceleration control shown in FIG. 3 for controlling the robot acceleration/deceleration, a plurality of registers equal to the number N obtained by dividing the acceleration/deceleration time T by the cycle τ are provided. A move command (speed command) is stored in the registers and the values of the registers are sequentially shifted in every processing cycle. The move command (speed command) for each cycle is obtained by dividing the sum of the values in all registers by the value N. Accordingly, in the first cycle immediately after the start of the acceleration/deceleration, the move command (speed command) equals (Vc/N), while the move command for the subsequent cycle is (2Vc/N), and the move command for the N-th cycle is Vc. Thereafter, the move command for each cycle remains at Vc as long as the move command (speed command) Vc is output. As a result, the speed increases linearly up to the command speed Vc, and remains at the command speed Vc thereafter.

Where an incremental processing similar to that of the robot acceleration control is performed as to the welding command voltage E and the welding command current I, the welding voltage and the welding current are set to values dependent on the robot moving speed. In the case where the robot is subjected to the above-described linear acceleration/deceleration control, a command voltage E(i) for a present cycle may be determined, for example, by adding an incremental value (Ec–Es)/N corresponding to one cycle to a welding command voltage E(i–1) of the preceding cycle, as follows:

E(i)=E(i–1)+(Ec–Es)/N

Similarly, a welding current command Ii can be obtained as follows:

I(i)=I(i–1)+(Ic–Is)/N where E(O)=Es and I(O)=Is.

As described above, the incremental processing is executed in Step S11, and the index i is increased in the subsequent Step S12, followed by termination of the present cycle. Thereafter, Steps S1 and S10 to S12 are repeatedly executed to gradually increase the welding command voltage E and the welding command current I, and when the index i becomes equal to (N+1), the moving speed of the robot reaches the command speed Vc, and the welding command voltage E and the welding command current I reach the normal welding voltage Ec and current Ic, respectively. In the next and following cycles, the incremental processing of Step S11 is not executed, and thus the welding command voltage E and the welding command current I remain unchanged. That is, the welding command voltage E and the welding command current I are controlled in accordance with the robot moving speed.

In the above embodiment, the description is made as to the case where the moving speed of the robot is accelerated; however, similar processing may also be applied to the case where the moving speed of the robot is to be decelerated. In this case, the welding voltage and current may be controlled by changing the welding command voltage E and the welding command current I in accordance with the moving speed of the robot.

As described above, according to the present invention, the welding voltage is gradually increased during the period from the output of an arc start command to the generation of an arc, and so no excessive voltage is applied in generating an arc. Consequently, no excess molten metal is formed at the time of generation of an arc, thus preventing the formation of a molten metal pool.

Further, during acceleration of the robot moving speed, the welding voltage and the welding current are controlled to increase gradually with the increase in the moving speed of the robot, whereby the formation of a molten metal pool can be prevented.

What is claimed is:

1. An arc welding control method for controlling arc welding operation of a welding robot having a machining electrode, comprising the steps of:

(a) setting a welding command voltage to a predetermined first voltage in response to an arc start command, to supply electric power between a workpiece and the electrode;

(b) gradually increasing the welding command voltage from the predetermined first voltage until an arc is generated between the workpiece and the electrode at an arc start voltage; and (c) decreasing the welding command voltage to a predetermined second voltage lower than the arc start voltage, when the arc generated in step (b) is detected.

2. The arc welding control method according to claim 1, wherein said increasing in step (b) includes increasing the welding command voltage stepwise from the initial voltage value.

3. An arc welding control method for controlling arc welding operation of a welding robot having a machining electrode, comprising the steps of:

(a) supplying electric power between a workpiece and the electrode to produce an arc at an arc start voltage;

(b) setting a welding command voltage to a predetermined stopped-state voltage lower than the arc start voltage and starting movement of the welding robot when the arc is generated between the workpiece and the electrode;

(c) gradually increasing the welding command voltage as a moving speed of the welding robot increases during an acceleration time until the moving speed of the welding robot reaches a predetermined moving speed; and (d) setting the welding command voltage to a normal welding voltage value when the moving speed of the welding robot has reached the predetermined moving speed.

4. An arc welding control method for controlling arc welding operation of a welding robot having a machining electrode, comprising the steps of:

(a) setting a welding command current to a predetermined initial current and setting a welding command voltage to a predetermined initial voltage in response to an arc start command, to supply electric power between a workpiece and the electrode;

(b) maintaining said welding command current and gradually increasing said welding command voltage from said initial voltage value until an arc is generated at an arc start voltaqe between the workpiece and the electrode;

(c) setting said welding command current and said welding command voltage to a predetermined stopped-state current and a predetermined stopped-state voltage, lower than said predetermined initial current and said arc start voltage, respectively, and starting movement of the welding robot when the arc is generated;

(d) increasing said welding command voltage and said welding command current as a moving speed of the welding robot increases during an acceleration time until the moving speed of the welding robot reaches a predetermined moving speed; and (e) setting said welding command voltage to a normal welding voltage and setting said welding command current to a normal welding current when the moving speed of the welding robot has reached the predetermined moving speed.

5. The arc welding control method according to claim 4, wherein said increasing in step (b) includes increasing said welding command voltage stepwise from the initial voltage value.

* * * * *

UNITED STATES PATENT AND TRADEMARK OFFICE
CERTIFICATE OF CORRECTION

PATENT NO. : 5,486,679
DATED :
INVENTOR(S) : January 23, 1996

Masayuki HAMURA et al.

It is certified that error appears in the above-indentified patent and that said Letters Patent is hereby corrected as shown below:

Title Page, [75], in Inventors, delete "Oshino" and insert –Minamitsuru– therein.

Column 2, line 34, change "ape" to –are–.

Column 3, line 5, change "are" to –arc–.

Signed and Sealed this

Ninth Day of April, 1996

Attest:

Attesting Officer

BRUCE LEHMAN

Commissioner of Patents and Trademarks